Oct. 10, 1967  W. B. HARRIS, JR  3,346,029
SAFETY SPATULA FOR FOOD BLENDER
Filed Dec. 6, 1965

WILLIAM B. HARRIS, JR.
INVENTOR.

BY
ATTORNEY

United States Patent Office 3,346,029
Patented Oct. 10, 1967

3,346,029
SAFETY SPATULA FOR FOOD BLENDER
William B. Harris, Jr., 1218 W. T. Waggoner Bldg.,
Fort Worth, Tex. 76102
Filed Dec. 6, 1965, Ser. No. 511,611
2 Claims. (Cl. 146—68)

This invention relates to a safety spatula for a food blender, and it concerns more particularly an improved, relatively safer hand tool for use, as a substitute for the usual spatula, for tamping and stirring food as it is processed in a conventional electrically driven food blender.

In the processing of foods in electric blenders, as in the preparation of cheese dips and the like, it is common practice to employ an ordinary spatula having a rubber covered end portion for tamping and stirring the food as supplied to the blender, whereby the food is advanced downwardly in the receptacle therefor, in opposing relation to the revolving blades, while at the same time scraping it from the sides of the receptacle, to promote the comminuting and mixing action of said blades.

The blades are of hardened steel and are rotated at high speeds, and care must be used to prevent the spatula from getting too close to the spinning blades, which could very well result in damage or personal injury, although the rubber covering of the spatula is characterized by its resilience as well as its toughness so that it is resistant to wear and also affords some protection to the blades. In any case it is an unpleasant experience to have the whirring blades strike the adjacent lower end of the spatula.

An object of this invention is to provide a simple, comparatively inexpensive device, suitable for use in the same way as an ordinary spatula is used, as above described, which because of its novel design cannot strike the revolving blades of the blender while in use.

Figure 1:
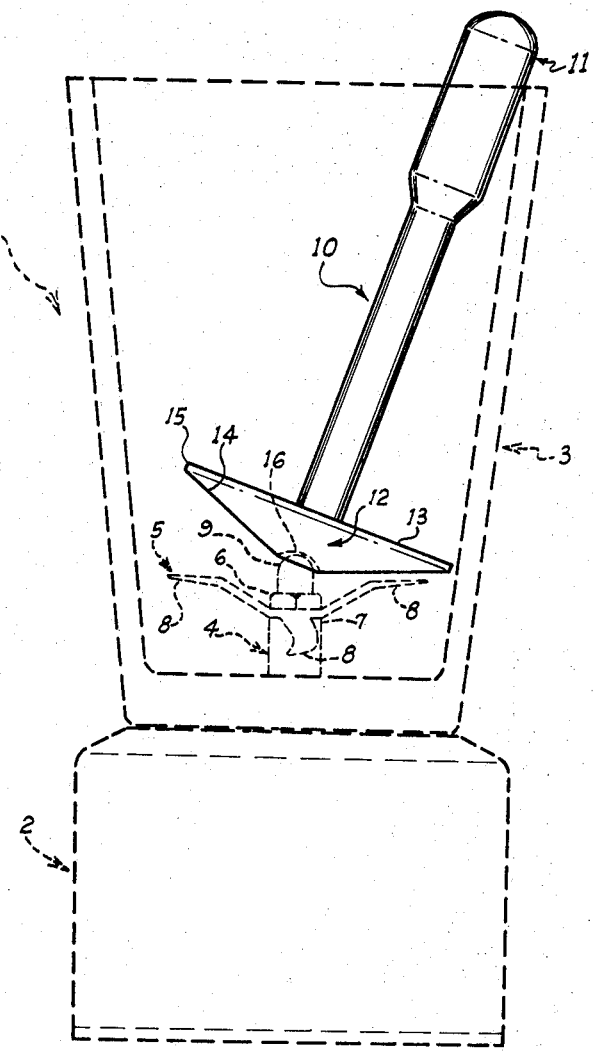
Figure 2:
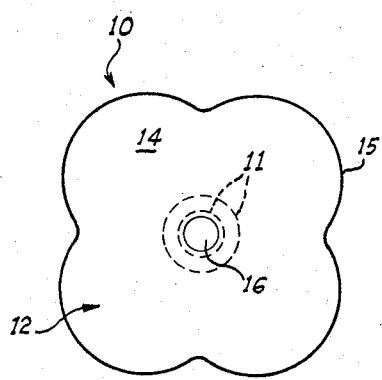

The invention will be readily understood by referring to the following description and the accompanying drawing, in which:

FIG. 1 is a longitudinal view of a stirring and tamping device embodying the invention, showing the device in one of its operative positions relative to an electrically driven food blender of conventional design, shown in elevation in broken lines; and FIG. 2 is a transverse view showing the lower end of the device as illustrated in FIG. 1.

Referring to the drawing, the numeral 1 designates generally an electrically driven food blender of conventional design, shown in broken lines. The blender 1 is one of several of the same general type which are now in use and which differ one from another primarily in size and shape, and in other relatively unimportant details.

In accordance with the usual practice the blender 1 includes a hollow base 2, which encloses an electric motor (not shown), and a food receptacle 3, open at the top, which is supported on the base 2 and extends upwardly therefrom. The shaft of the motor, a portion of which is shown and indicated by the numeral 4, is arranged vertically and extends above the base 2, through an opening therefor in the bottom of the receptacle 3.

The shaft 4 has a blade unit 5 removably connected to its upper end by clamping engagement between a nut 6 threaded on a reduced end portion of the shaft 4 and an upwardly facing shoulder 7 thereon. As shown, the blade unit 5 has a plurality of integral blades 8 which extend radially outwardly from the shaft 4. The extreme upper end of the shaft 4 is rounded, as at 9.

As shown best in FIG. 1, the blades 8 are bent intermediate their ends, and their outer ends extend upwardly above the nut 6 and are positioned at an elevation which is only slightly lower than the upper end 9 of the shaft 4.

The receptacle 3, which in accordance with the usual practice may have a configuration resembling a clover leaf, or may be round, or rectangular, in transverse section, is progressively enlarged in an upward direction, and its dimensions are such that it closely surrounds the blade unit 5 immediately adjacent its lower end.

The tamping and stirring device of the invention, indicated generally by the numeral 10, which is formed in one piece and advantageously may be made of wood, rubber, or molded plastic material, as desired, includes an elongated handle 11 and an enlarged integral end portion 12 as hereinafter described which extends laterally outwardly from the handle 11 and forms therewith a substantially rigid, unitary structure.

In use the device 10 is positioned with the handle 11 uppermost, as illustrated in FIG. 1. As shown in FIG. 2, the enlarged end portion 12 of the device 10, which in use is positioned lowermost, may have a configuration resembling a clover leaf, in transverse section, and the size and shape thereof conforms generally to the inside of the receptacle 3 immediately above blade unit 5.

The enlarged end portion 12, which has lateral dimensions greater than its thickness in a longitudinal direction, relative to the handle 11, and as shown is planar on its top side, perpendicular to the handle 11, as at 13, is of progressively reduced thickness in a laterally outward direction, and its under side is inclined radially outwardly and upwardly, as at 14, and terminates in a comparatively thin peripheral edge, as at 15.

The enlarged end portion 12 has a rounded depression in its under side, centrally thereof, as at 16, for abutting engagement by the rounded upper end 9 of the shaft 4, whereby the device 10 is adapted to be supported at its lower end on the rounded upper end 9 of the shaft 4, in its lowermost position.

The enlarged end portion 12 is centered relative to the receptacle 3 by abutting engagement of the depression 16 with the upper end 9 of the shaft 4, which also limits movement of the device 10 in a downward direction. The inclination of the under side 14 of the enlarged end portion 12 is such that, in the lowermost position of the device 10, and in a tilted position thereof, shown in FIG. 1, in which the upper end of the handle 11 rests against the rim of the receptacle 3, which limits pivotal movement of the device 10 in a downward direction about the rounded upper end 9 of the shaft 4, the under side 14 of the enlarged end portion 12 is spaced apart from the blade unit 5.

The invention may be modified in various ways without departing from the spirit and scope thereof.

I claim:

1. In a tamping and stirring device for use with an electrically driven blender having an electric motor and having a food receptacle, open at the top, supported above the motor, the shaft of the motor being arranged vertically and extending upwardly through the bottom of said receptacle, and having a blade unit on its upper end, the combination of a substantially rigid, unitary structure including an elongated handle and an enlarged integral end portion extending laterally outwardly from the handle, said device in use being receivable in said receptacle with said handle positioned uppermost and said enlarged end portion being engageable with the upper end of said motor shaft, whereby said device is adapted to be supported in its lowermost position, above said blade unit, said enlarged end-portion having a rounded depression in its under side, centrally thereof, for abutting engagement by the upper end of said shaft, and the inclination of the under side of said enlarged end portion being such that, in the lowermost position of said device, and in a tilted position, in which the upper end of said handle rests against the rim of said receptacle, the under side of said enlarged end portion is spaced apart from said blade unit.

2. The structure of claim 1, said enlarged end portion having a configuration and having dimensions such that it is conformable to the inside of said receptacle in its lowermost position, said enlarged end portion having lateral dimensions greater than its thickness in a longitudinal direction, relative to said handle, and being of progressively reduced thickness in a laterally outward direction, the under side of said enlarged end portion being inclined radially outwardly and upwardly, and terminating in a comparatively thin peripheral edge.

References Cited

UNITED STATES PATENTS 3,088,345  5/1963  Campbell _____ 146—182 X

FOREIGN PATENTS 164,471  10/1905  Germany.

W. GRAYDON ABERCROMBIE, *Primary Examiner.*